United States Patent
Kim et al.

(10) Patent No.: US 7,852,451 B2
(45) Date of Patent: Dec. 14, 2010

(54) MANUFACTURING METHOD OF LIQUID DISPLAY DEVICE HAVING TOUCH SCREEN FUNCTION

(75) Inventors: Seong-Ho Kim, Yongin-si (KR);
Hae-Young Yun, Suwon-si (KR);
Sang-Woo Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 427 days.

(21) Appl. No.: 11/862,087

(22) Filed: Sep. 26, 2007

(65) Prior Publication Data

US 2008/0079857 A1    Apr. 3, 2008

(30) Foreign Application Priority Data

Sep. 29, 2006    (KR) .................. 10-2006-0095860

(51) Int. Cl.
G02F 1/1335    (2006.01)
(52) U.S. Cl. .............. 349/187; 349/112; 345/173
(58) Field of Classification Search ........... 349/12
See application file for complete search history.

(56) References Cited

U.S. PATENT DOCUMENTS 6,445,426 B1 *  9/2002  Kang et al. .............. 349/12
2001/0043291 A1 * 11/2001  Kono et al. ............... 349/12
2006/0072045 A1 *  4/2006  Tanabe et al. ............. 349/12
2007/0002192 A1 *  1/2007  Nishino et al. ............ 349/12

FOREIGN PATENT DOCUMENTS

| CN | 1675580 A | 9/2005 |
|----|-----------|--------|
| JP | 2003-255855 | 9/2003 |

* cited by examiner

Primary Examiner—Richard H Kim
(74) Attorney, Agent, or Firm—Innovation Counsel LLP

(57) ABSTRACT

A manufacturing method for a liquid crystal display (LCD) includes forming an upper panel and a lower panel, applying a sealant to either one of the panels, adding a liquid crystal material within a boundary of the sealant, coupling the upper panel and the lower panel, and forming a sensor in an upper part of the upper panel. The LCD includes a lower panel; an upper panel that is coupled to the lower panel by the sealant; a lower resistance film that is formed in a predetermined region of an upper part of the upper panel; a lower contact electrode that is formed in a surrounding part of the lower resistance film; an upper resistance film that is disposed apart from and opposite to the lower resistance film by a spacer; an upper contact electrode that is formed on a lower surface of the upper resistance film that is opposite to the lower resistance film and that is formed in a surrounding part of the upper resistance film; an upper polarizer that is positioned on the upper resistance film; and a lower polarizer that is attached to a lower part of the lower panel.

10 Claims, 5 Drawing Sheets

MANUFACTURING METHOD OF LIQUID DISPLAY DEVICE HAVING TOUCH SCREEN FUNCTION

CROSS-REFERENCE TO RELATED APPLICATION

This application claims priority to and the benefit of Korean Patent Application No. 10-2006-0095860 filed in the Korean Intellectual Property Office on Sep. 29, 2006, the entire contents of which are incorporated herein by reference.

BACKGROUND OF THE INVENTION (a) Field of the Invention

The present invention relates to a liquid crystal display. More particularly, the present invention relates to a liquid crystal display having a touch screen function and a manufacturing method thereof.

(b) Description of the Related Art

As a representative display device, a liquid crystal display (LCD) includes two display panels having pixel electrodes and a common electrode, and a liquid crystal layer having dielectric anisotropy therebetween. The pixel electrodes are arranged in a matrix form and are each connected to a switching element such as a thin film transistor (TFT) to sequentially receive a data voltage on a row by row basis. The common electrode is formed over an entire surface of the display panel to receive a common voltage. A pixel electrode, the common electrode, and the liquid crystal layer therebetween constitute a liquid crystal capacitor from a circuital view, and the liquid crystal capacitor and a switching element connected thereto become a basic unit constituting a pixel.

In the LCD, an electric field is generated in a liquid crystal layer by applying a voltage to two electrodes, and a desired image is obtained by adjusting transmittance of light passing through the liquid crystal layer through adjusting intensity of the electric field.

A touch screen panel is an device for allowing a machine such as a computer to execute a command by writing a character, drawing a picture, or executing an icon through touching a finger, a touch pen, etc., on a screen.

An LCD to which the touch screen panel is attached can determine whether a user's finger, a touch pen, or similar item touches the screen, and the touch position information.

However, in the LCD to which the touch screen panel is attached, the cost increases due to the addition of the touch screen panel, and the production yield decreases due to an additional process of bonding the touch screen panel to the liquid crystal panel. Further, when injecting liquid crystal in order to manufacture the LCD, a touch method is used, whereby mass production is impossible and thus production yield decreases.

SUMMARY OF THE INVENTION

One embodiment of the present invention provides a manufacturing method of an LCD, including: forming an upper panel and a lower panel; applying a sealant to either one of the panels; adding a liquid crystal within the sealant; coupling the upper panel and the lower panel; and forming a sensor in an upper part of the upper panel.

The forming of a sensor may include forming a lower ITO resistance film on the upper panel; forming a lower contact electrode in a surrounding part of the lower ITO resistance film; forming an upper ITO resistance film in an upper polarizer; forming an upper contact electrode in a surrounding part of the upper ITO resistance film; and attaching the upper polarizer and the upper panel so that the upper ITO resistance film and the lower ITO resistance film are opposite to each other.

The forming of a sensor may include forming a lower ITO resistance film on the upper panel; forming a lower contact electrode in a surrounding part of the lower ITO resistance film; attaching an optical film to an upper polarizer; forming an upper ITO resistance film on the optical film; forming an upper contact electrode in a surrounding part of the upper ITO resistance film; and attaching the upper polarizer and the upper panel so that the upper ITO resistance film and the lower ITO resistance film are opposite to each other.

The lower contact electrode may be formed along two sides of the lower ITO resistance film that are opposite to each other, and the upper contact electrode may be formed along two sides of the upper ITO resistance film that are opposite to each other.

The manufacturing method may further include attaching a lower polarizer to a lower part of the lower panel.

Another embodiment of the present invention provides a manufacturing method of an LCD, including: forming a display unit: forming a lower resistance film using a shadow mask in an upper part of the display unit; forming a lower contact electrode in a surrounding part of the lower resistance film; forming an upper resistance film in an upper polarizer; forming an upper contact electrode in a surrounding part of the upper resistance film; and attaching the upper polarizer and the display unit so that the upper resistance film and the lower resistance film are opposite to each other.

The upper resistance film and the lower resistance film may be made of ITO.

The upper resistance film may be connected to the upper contact electrode to be formed in a region excluding a region of an upper terminal for connecting the upper contact electrode to an external flexible printed circuit (FPC).

The lower resistance film may be connected to the lower contact electrode to be formed in a region excluding a region of a lower terminal for connecting the lower contact electrode to an external FPC.

The upper contact electrode may be made of silver (Ag).

The lower contact electrode may be made of silver (Ag).

Yet another embodiment of the present invention provides an LCD including: a lower panel; an upper panel that is coupled to the lower panel by a sealant; a lower resistance film that is formed in a predetermined region of an upper part of the upper panel; a lower contact electrode that is formed in a surrounding part of the lower resistance film; an upper resistance film that is disposed apart from and opposite to the lower resistance film by a spacer; an upper contact electrode that is formed on a lower surface of the upper resistance film that is opposite to the lower resistance film and that is formed in a surrounding part of the upper resistance film; an upper polarizer that is positioned on the upper resistance film; and a lower polarizer that is attached to a lower part of the lower panel, wherein the sealant has a uniform thickness.

The LCD may further include an optical film between the upper resistance film and the upper polarizer.

The upper resistance film and the lower resistance film may be made of ITO.

The upper contact electrode may be made of silver (Ag).

The lower contact electrode may be made of silver (Ag).

The lower contact electrode may be formed along two sides of the lower resistance film that are opposite to each other, and the upper contact electrode may be formed along two sides of the upper resistance film that are opposite to each other.

DETAILED DESCRIPTION OF THE INVENTION

Figure 1:
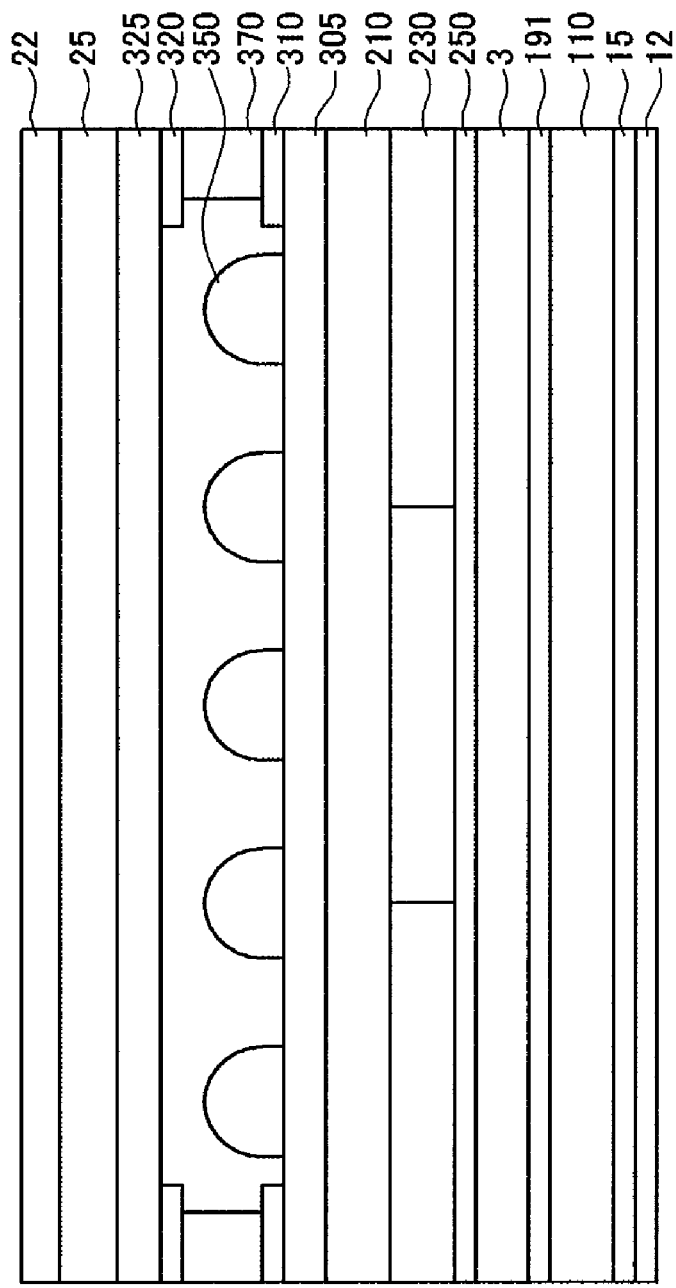
FIG. 1 is a cross-sectional view of an LCD according to an exemplary embodiment of the present invention.

The present invention relates to providing an LCD and a manufacturing method thereof having advantages of providing an LCD having a touch screen function and increasing a production yield of an LCD having a touch screen function.

The present invention is described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, an LCD according to a first embodiment of the present invention is described below in detail with reference to FIG. 1.

FIG. 1 is a cross-sectional view of an LCD according to an exemplary embodiment of the present invention.

The LCD according to an exemplary embodiment of the present invention includes a display unit and a sensor.

The display unit includes an upper substrate 210, a lower substrate 110, a pixel electrode 191, a common electrode 250, a color filter 230, and a liquid crystal layer 3 between the upper substrate 210 and the lower substrate 110. A lower polarizer 12 is attached to a lower part of the lower substrate 110 using an adhesive 15.

The sensor includes a lower ITO resistance film 305 and an upper ITO resistance film 325 that are formed in an upper part of the upper substrate 210; a lower contact electrode 310, an upper contact electrode 320, a spacer 350, and a seal member 370 that are positioned between the lower ITO resistance film 305 and the upper ITO resistance film 325; and an upper polarizer 22 that is attached to an upper part of the upper ITO resistance film 325 using an adhesive 25. An optical film may further be included between the upper ITO resistance film 325 and the upper polarizer 22.

A structure of the LCD shown in FIG. 1 will be described in detail.

First, FIG. 1 shows only common constituent elements of the display unit.

The display unit may be variously formed, and a structure of a general display unit is as follows.

A plurality of gate lines (not shown) and a plurality of storage electrode lines (not shown) are formed on the lower substrate 110 that is made of transparent glass, plastic, or similar material.

The gate lines transfer gate signals and generally extend in a horizontal direction. Each gate line includes a wide end part for connecting a plurality of gate electrodes (not shown) to other layers or an external driving circuit.

The storage electrode line receives a predetermined voltage and includes a storage electrode (not shown). A gate insulating layer (not shown) that is made of silicon nitride (SiNx), silicon oxide (SiOx), or so on is formed on the gate line and the storage electrode line.

A semiconductor (not shown) that is made of hydrogenated amorphous silicon, polysilicon, or so on is formed on the gate insulating layer. An ohmic contact (not shown) is formed on the semiconductor.

The ohmic contact may be made of a material such as n+ hydrogenated amorphous silicon in which an n-type impurity such as phosphorus is doped with a high concentration, or of silicide. A plurality of data lines (not shown) and a plurality of drain electrodes (not shown) are formed on the ohmic contact and the gate insulating layer.

The data lines transfer data signals and are generally extended in a vertical direction to intersect the gate lines and the storage electrode lines. Each data line includes a wide end part (not shown) for connecting a plurality of source electrodes (not shown) that are extended toward the gate electrodes to other layers or an external driving circuit.

The drain electrodes are separated from the data lines and face a source electrode about a gate electrode.

One gate electrode, one source electrode, one drain electrode, and the semiconductor constitute one TFT, and a channel of the TFT is formed between the source electrode and the drain electrode.

The ohmic contact exists only between the lower semiconductor and the upper data line and drain electrode, and lowers contact resistance between them.

A passivation layer (not shown) is formed on the data line, the drain electrode, and an exposed portion of the semiconductor. The passivation layer is made of an inorganic insulator such as silicon nitride and silicon oxide, an organic insulator, or a low dielectric insulator.

A plurality of pixel electrodes 191 and a plurality of contact assistants (not shown) are formed on the passivation layer. They may be made of a transparent conductive material such as ITO (indium tin oxide) and IZO (indium zinc oxide), or a reflective metal such as aluminum, silver, or alloys thereof.

The pixel electrode 191 is physically and electrically connected to the drain electrode through a contact hole and receives a data voltage from the drain electrode. The pixel electrode 191 to which a data voltage is applied and the common electrode 250 of the upper substrate 210 that receives a common voltage generate an electric field, thereby determining a direction of liquid crystal molecules of the liquid crystal layer 3 between two electrodes.

The pixel electrode 191 is overlapped with the storage electrode and the storage electrode line. A capacitor that is formed with the overlap of the pixel electrode 191 and drain electrode that is electrically connected thereto and the storage electrode line is referred to as a storage capacitor, and the storage capacitor enhances voltage storage ability of the liquid crystal capacitor.

Each of the contact assistants is connected to an end part of the gate line and an end part of the data line through the contact holes.

The upper substrate 210 is made of glass, plastic, or similar material, and a light blocking member (not shown) is formed on the insulating substrate 210. The light blocking member includes a line-shaped part corresponding to the gate line and the data line and a plane-shaped part corresponding to the TFT, and it prevents light leakage between the pixel electrodes 191.

A plurality of color filters 230 are also formed on the upper substrate 210. The color filters 230 exists most within a region that is surrounded with the light blocking member, and may be extended long in a vertical direction along a column of the pixel electrodes 191. Each color filter 230 can display one of three primary colors consisting of red, green, and blue colors.

An overcoat (not shown) is formed on the color filter 230 and the light blocking member. The overcoat may be made of an organic insulator, and it prevents the color filter 230 from being exposed and provides a flat plane.

The common electrode 250 is formed on the overcoat. The common electrode 250 is made of a transparent conductor such as ITO and IZO.

An alignment layer (not shown) is coated on an inner surface of the pixel electrode 191 and the common electrode 250, and may be a vertical alignment layer or a horizontal alignment layer.

The liquid crystal layer 3 that is positioned between the pixel electrode 191 and the common electrode 250 has dielectric anisotropy. In a state where there is no electric field, liquid crystal molecules of the liquid crystal layer 3 may have a vertical alignment (VA) mode in which a long axis thereof is aligned to be vertical to surfaces of the two substrates 110 and 210, or a twisted nematic (TN) mode in which a long axis thereof is aligned to be horizontal to surfaces of the two substrates 110 and 210.

When a common voltage is applied to the common electrode 250 and a data voltage is applied to the pixel electrode 191, an electric field is generated therebetween. Liquid crystal molecules respond to an electric field to change an alignment direction thereof.

The display unit may be variously formed, and unlike descriptions described above, the common electrode 250 and the pixel electrode 191 may be formed on the same substrate.

A lower polarizer 12 is attached to a lower part of the display unit using the adhesive 15. The lower polarizer 12 and the upper polarizer 22 perform a function of filtering a part or all of light passing through the liquid crystal layer 3.

A sensor for determining a touch position when an external material is touched is formed in the upper part of the upper substrate 210.

A structure of the sensor is as follows.

A lower ITO resistance film 305 and a lower contact electrode 310 are formed on an upper surface of the upper substrate 210, and an upper contact electrode 320 and an upper ITO resistance film 325 are formed in an upper part of the lower contact electrode 310. The lower contact electrode 310 and the upper contact electrode 320 are formed to surround the lower ITO resistance film 305 and the upper ITO resistance film 325 in a surrounding part of the lower ITO resistance film 305 and the upper ITO resistance film 325.

A spacer 350 and a seal member 370 are formed between the upper ITO resistance film 325 and the lower ITO resistance film 305 so that the upper ITO resistance film 325 may be disposed apart by a predetermined distance from the lower ITO resistance film 305. The seal member 370 is formed to support the upper ITO resistance film 325 and the lower ITO resistance film 305 along an outer edge of the upper ITO resistance film 325 and the lower ITO resistance film 305, and the spacer 350 allows the upper ITO resistance film 325 and the lower ITO resistance film 305 to be separated from each other in a center part. It is preferable that the spacer 350 is made of a conductor. The upper polarizer 22 is attached to the upper ITO resistance film 325 by the adhesive 25.

The upper ITO resistance film 325 and the lower ITO resistance film 305 contact each other by way of an external stimulus, and operate with a method of detecting a contact position by measuring resistance. After the contact, the upper ITO resistance film 325 and the lower ITO resistance film 305 are again separated from each other by the spacer 350. The upper contact electrode 320 and the lower contact electrode 310 perform a function of applying a voltage or a current to the upper ITO resistance film 325 and the lower ITO resistance film 305. The upper contact electrode 320 and the lower contact electrode 310 may be made of a material such as silver (Ag).

As described above, as the lower contact electrode 310 is formed in the lower ITO resistance film that is formed in the upper substrate 210 of the display unit, rather than on a separate substrate, the thickness of the display device can be reduced and the cost can be reduced.

Hereinafter, a manufacturing method of an LCD according to an exemplary embodiment of the present invention is described.

Figure 2:
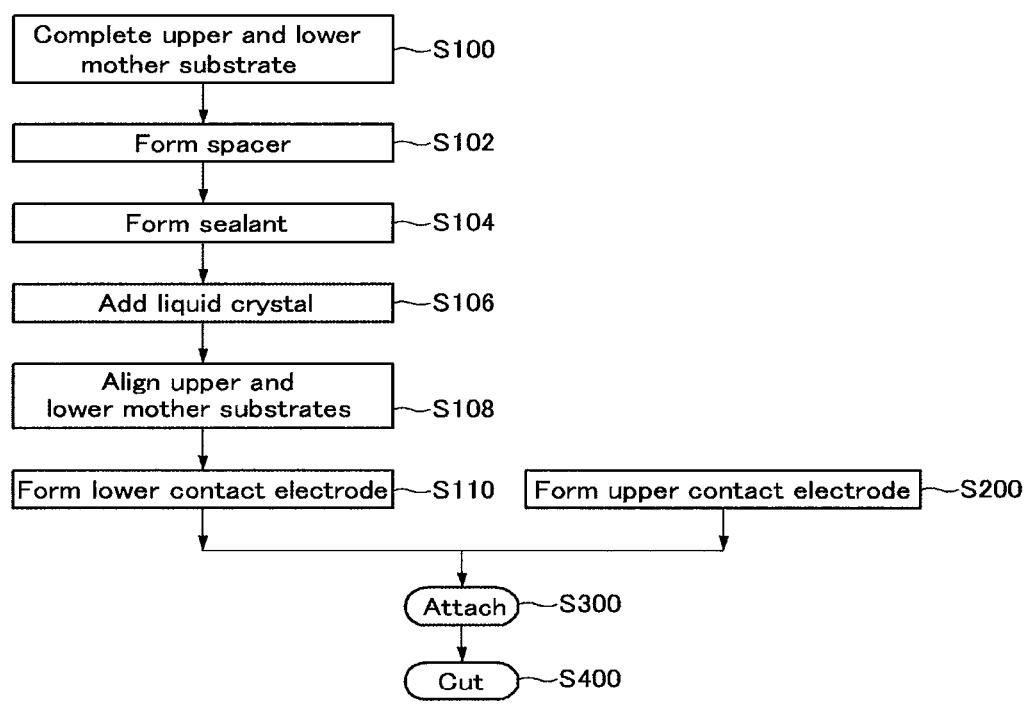
FIG. 2 is a flow chart illustrating a manufacturing method of an LCD according to an exemplary embodiment of the present invention.

As shown in FIG. 2, upper and lower mother substrates in which wiring is formed are completed by forming each layer such as of gate lines and data lines in the upper and lower mother substrates (S100).

Thereafter, a column spacer of a pillar shape that is formed in a photolithography process or a bead spacer of a spherical shape for sustaining an interval of the upper and lower mother substrates is formed on one of the upper and lower mother substrates (S102).

A sealant which is made of a material for coupling two mother substrates and defines a region within which liquid crystal is filled and prevents liquid crystal from leaking out is formed on one of the upper and lower mother substrates (S104).

Liquid crystal is poured within the region defined by the sealant (S106).

Next, the upper and lower mother substrates are aligned and coupled (S108).

In a liquid crystal pouring method, an injection hole for injecting liquid crystal is not necessary to complete an LCD. Accordingly, the sealant has a uniform thickness surrounding the liquid crystal. Further, when an LCD is manufactured using the liquid crystal pouring method, mass production is possible and thus production yield increases, compared to a case of using a touch method.

Thereafter, a lower ITO resistance film 305 is formed by coating ITO in a predetermined region on the upper substrate 210 of the formed display unit. The lower ITO resistance film 305 is formed using a shadow mask.

When an ITO resistance film is formed using a method of electrically insulating by performing laser etching in a necessary region after coating an ITO thin film on an entire surface of the upper substrate, a fault such as light leakage may be generated as a lower film and a circuit at the inside of the display unit are damaged by the laser etching. Accordingly, the lower ITO resistance film 310 is formed using a shadow mask that can coat ITO only in a desired region and that can perform a process on a mother substrate unit.

Figure 3:
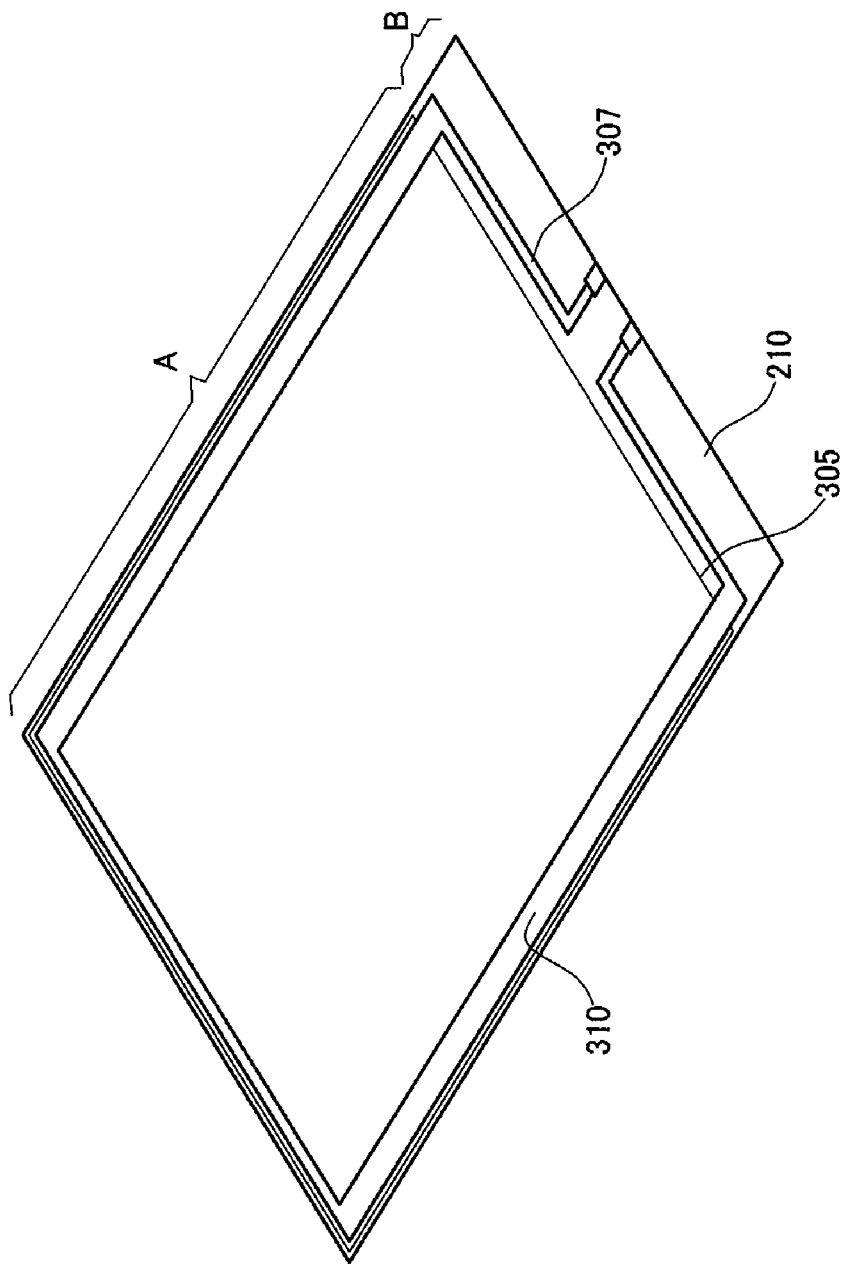
FIG. 3 is a perspective view illustrating a lower ITO resistance film formed on an upper substrate in an LCD according to an exemplary embodiment of the present invention.

FIG. 3 is a perspective view illustrating a shape in which a lower ITO resistance film is formed on an upper substrate in an LCD according to an exemplary embodiment of the present invention.

As shown in FIG. 3, the lower contact electrode 310 is formed along two sides of the lower ITO resistance film 305 that are opposite to each other. Further, in order to connect the lower contact electrode 310 to an external flexible printed circuit (FPC) (not shown), a lower terminal 307 that is connected to the lower contact electrode 310 is extended to one side of the lower ITO resistance film 305.

The lower ITO resistance film 305 is formed in a region (A) excluding a region (B) in which the lower terminal 307 is formed on the upper substrate 210.

That is, as shown in FIG. 3, the lower ITO resistance film 305 is not formed in a portion in which the lower terminal 307 of the lower contact electrode 310 that is made of silver (Ag), to be formed later, is formed.

When ITO is coated using a shadow mask, the ITO is coated only in a desired portion, whereby an ITO resistance film is not exposed to the outside of a contact electrode and thus reliability can be improved.

Thereafter, a lower contact electrode for the sensor is formed using silver (Ag) (S110).

As the lower contact electrode is formed within a region of a light blocking member that is formed in the upper substrate, the lower contact electrode has no influence on a display area.

Alternatively, the upper ITO resistance film 325 is formed in the upper polarizer 22, and the upper contact electrode is formed in a surrounding part of the upper ITO resistance film (S200).

Figure 4:
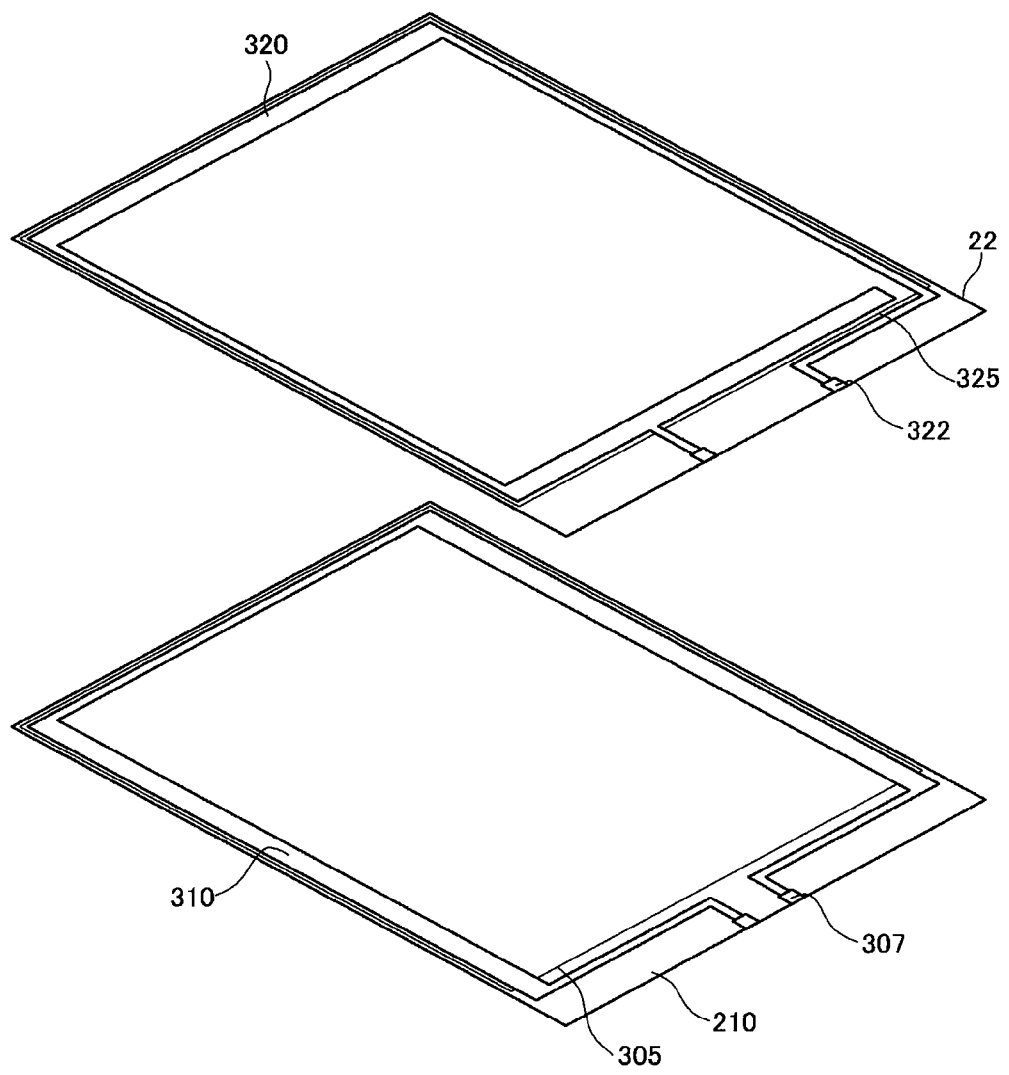
FIG. 4 is a perspective view illustrating an upper contact electrode and a lower contact electrode formed in an upper ITO resistance film and a lower ITO resistance film, respectively, in an LCD according to an exemplary embodiment of the present invention.

FIG. 4 is a perspective view illustrating a shape in which an upper contact electrode 320 and a lower contact electrode 310 are formed in an upper ITO resistance film 325 and a lower ITO resistance film 305, respectively, in an LCD according to an exemplary embodiment of the present invention.

As shown in FIG. 4, the upper contact electrode 320 is formed along two sides of the upper ITO resistance film 325 that are opposite to each other, and the lower contact electrode 310 is formed along two sides of the lower ITO resistance film 305 that are opposite to each other. Further, in order to connect the upper contact electrode 320 and the lower contact electrode 310 to an external FPC (not shown), an upper terminal 322 and a lower terminal 307 that are connected to the upper contact electrode 320 and the lower contact electrode 310 are extended to sides, which are in the same direction, of the lower ITO resistance film 305 and the upper ITO resistance film 325. The upper ITO resistance film 325 is not formed in a region on the upper polarizer 22 in which the upper terminal 322 is formed.

The upper contact electrode is made of silver (Ag).

Figure 5:
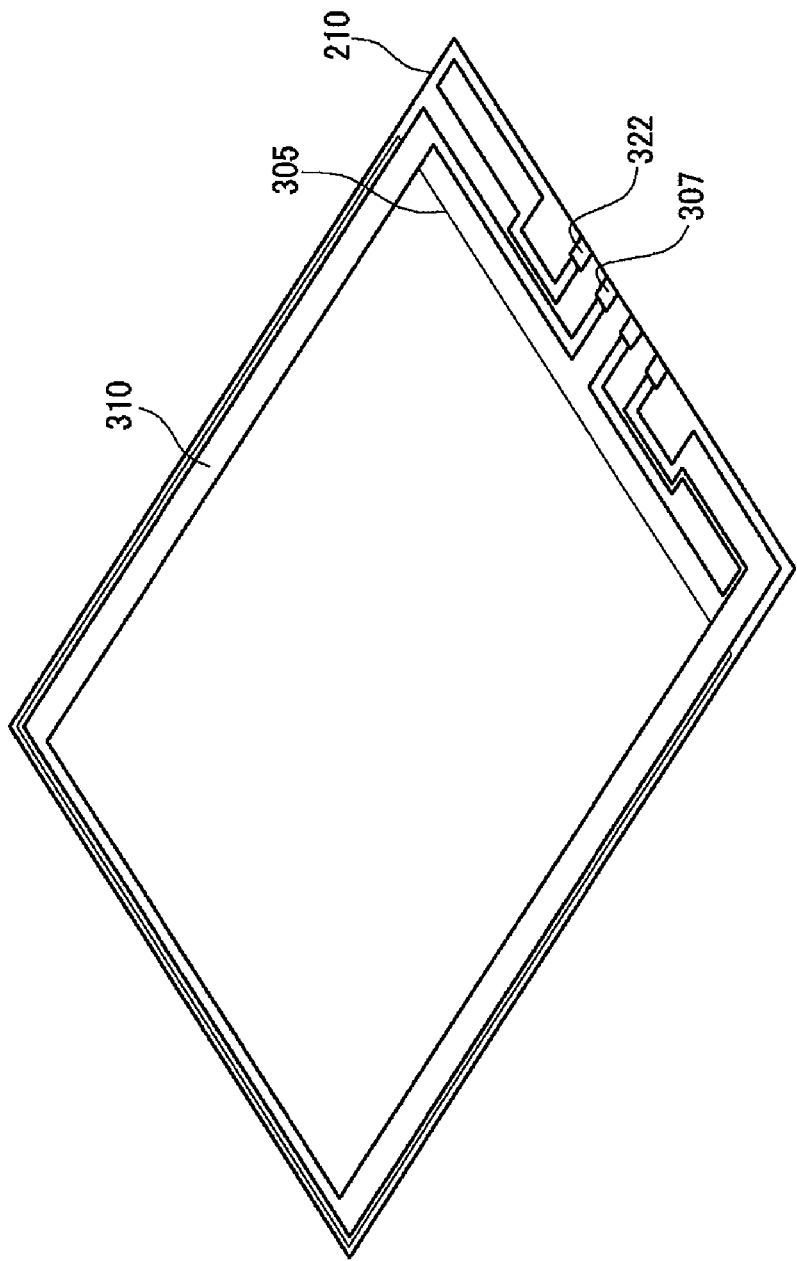
FIG. 5 is a perspective view illustrating a flip chip on glass (FOG) in an LCD according to an exemplary embodiment of the present invention.

As shown in FIG. 5, the contact electrode may be formed in an FOG (Flip chip on glass) form in which both the upper and lower terminals of the contact electrode are formed on the lower ITO resistance film 305.

Thereafter, the spacer 350 and the seal member 370 are positioned in and attached to the upper ITO resistance film 325 and the lower ITO resistance film 305 (S300).

Thereafter, the lower polarizer 12 is attached to a lower part of the lower substrate 110 using the adhesive 15.

An LCD having a touch screen function is completed by scribing along a cut line of a mother substrate, thus separating each liquid crystal cell (S400).

A configuration of the sensor may be variously formed.

As described above, when manufacturing an LCD having a touch screen function, by mass-producing the LCD using a liquid crystal dripping method, product yield and product reliability can be improved by forming an ITO resistance film of a sensor using a shadow mask.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing method of a liquid crystal display, the method comprising:
    forming first and second mother substrates;
    applying a sealant to one of the first and second mother substrates, the sealant being applied in a pattern to define an area to receive and contain a liquid crystal material;
    adding a liquid crystal material within the area defined by the sealant;
    coupling the first and second mother substrates;
    forming a sensor on one of the first and second mother substrates; and
    cutting along a cut line of the first and second mother substrates after forming the sensor on one of the first and second mother substrates.

2. The manufacturing method of claim 1, wherein forming a sensor comprises:
    forming a first resistance film on the first mother substrate;
    forming a first contact electrode in contact with the first resistance film;
    forming a second resistance film on a first polarizer;
    forming a second contact electrode in contact with the second resistance film; and
    placing the first polarizer and the first mother substrate in a spaced apart relationship such that first resistance film faces the second resistance film.

3. The manufacturing method of claim 2,
    further comprising forming an optical film between the first polarizer and the second resistance film.

4. The manufacturing method according to claim 3, wherein the first contact electrode is formed along first and second opposing sides of the first resistance film, and further wherein the second contact electrode is formed along first and second opposing sides of the second resistance film.

5. The manufacturing method of claim 2, wherein forming the first resistance film on the first mother substrate comprises using a shadow mask.

6. The manufacturing method of claim 5, wherein the second resistance film is formed in a region excluding a region of an upper terminal for connecting the second contact electrode to a flexible printed circuit.

7. The manufacturing method of claim 5, wherein the first resistance film is formed in a region excluding a region of a lower terminal for connecting the first contact electrode to a flexible printed circuit.

8. The manufacturing method of claim 5, wherein the first contact electrode is made of silver (Ag).

9. The manufacturing method of claim 5, wherein the second contact electrode is made of silver (Ag).

10. The manufacturing method of claim 1, further comprising attaching a polarizer to one of the mother substrates.

* * * * *